United States Patent
Tsu et al.

(10) Patent No.: US 11,817,012 B2
(45) Date of Patent: Nov. 14, 2023

(54) SYSTEMS AND METHODS FOR AUTOMATED ASSESSMENT OF AUTHORSHIP AND WRITING PROGRESS

(71) Applicant: PowerNotes LLC, Chicago, IL (US)

(72) Inventors: Wilson Tsu, Chicago, IL (US); Matthew Pelmear, Los Angeles, CA (US)

(73) Assignee: POWERNOTES LLC, Chicago, IL (US)

( * ) Notice: Subject to any disclaimer, the term of this patent is extended or adjusted under 35 U.S.C. 154(b) by 343 days.

(21) Appl. No.: 16/948,152

(22) Filed: Sep. 4, 2020

(65) Prior Publication Data

US 2021/0065575 A1 Mar. 4, 2021

Related U.S. Application Data

(60) Provisional application No. 62/895,628, filed on Sep. 4, 2019.

(51) Int. Cl.
G09B 7/00 (2006.01)
G06F 40/253 (2020.01)
G06F 40/137 (2020.01)
G06F 40/169 (2020.01)

(52) U.S. Cl.
CPC ............ G09B 7/00 (2013.01); G06F 40/137 (2020.01); G06F 40/169 (2020.01); G06F 40/253 (2020.01)

(58) Field of Classification Search
None
See application file for complete search history.

(56) References Cited

U.S. PATENT DOCUMENTS

| | | | |
|---|---|---|---|
| 2006/0112146 A1* | 5/2006 | Song | G06Q 10/10 |
| 2009/0226872 A1* | 9/2009 | Gunther | G09B 7/00 434/350 |
| 2010/0151431 A1* | 6/2010 | Miller | G09B 5/00 434/350 |
| 2010/0190142 A1* | 7/2010 | Gal | G09B 5/00 434/322 |
| 2011/0065082 A1* | 3/2011 | Gal | G09B 7/02 434/365 |
| 2013/0031208 A1* | 1/2013 | Linton | G09B 7/02 709/217 |
| 2013/0212521 A1* | 8/2013 | Fedoseyeva | G06Q 10/00 715/781 |
| 2014/0101085 A1* | 4/2014 | Lu | G06N 5/02 706/46 |
| 2014/0335497 A1* | 11/2014 | Gal | G09B 7/00 434/323 |

(Continued)

*Primary Examiner* — Nathan Hillery
(74) *Attorney, Agent, or Firm* — Husch Blackwell LLP (57) ABSTRACT

Systems and methods for automatically assessing authorship of written work and progress toward successful completion of written tasks, such as academic or professional writing assignments are provided. Such systems and methods can include tracking research and writing tasks performed within a research application environment over time in connection creating an assignment document for a user account, extracting evaluation data from the research and writing tasks, and executing an assignment evaluation engine to generate a score for the assignment document based on the evaluation data.

14 Claims, 6 Drawing Sheets

(56) References Cited

U.S. PATENT DOCUMENTS

| | | | |
|---|---|---|---|
| 2015/0032645 A1* | 1/2015 | McKeown | G06Q 10/00 |
| | | | 705/311 |
| 2016/0300141 A1* | 10/2016 | Veeraragavan | H04L 67/535 |
| 2017/0329757 A1* | 11/2017 | Knudson | G06F 40/169 |
| 2018/0121831 A1* | 5/2018 | Puzicha | G06F 16/93 |
| 2018/0293434 A1* | 10/2018 | Wang | G06K 9/6256 |
| 2018/0374377 A1* | 12/2018 | Watkins, Jr. | G09B 7/00 |
| 2019/0303540 A1* | 10/2019 | Shirasaka | G06F 21/10 |
| 2020/0057976 A1* | 2/2020 | Prakash | G06Q 10/0633 |
| 2020/0273364 A1* | 8/2020 | Donaldson | G06N 5/046 |

* cited by examiner

| Evaluation Criteria | Rating Ranges | | | | Total Points |
|---|---|---|---|---|---|
| - At least 5 primary sources used and linked<br>- Quotations are used<br>- Sources are annotated | 20 to 16 points<br>Mastery | 16 to 12 points<br>Competence | 12 to 8 points<br>Developing | 8 to 4 points<br>Rudimentary | 4 to 0 points<br>Off track | 20 points total |
| Source materials are associated with rhetorical strategies | 20 to 16 points<br>Mastery | 16 to 12 points<br>Competence | 12 to 8 points<br>Developing | 8 to 4 points<br>Rudimentary | 4 to 0 points<br>Off track | 20 points total |
| Analysis of rhetorical strategies | 20 to 16 points<br>Mastery | 16 to 12 points<br>Competence | 12 to 8 points<br>Developing | 8 to 4 points<br>Rudimentary | 4 to 0 points<br>Off track | 20 points total |
| Number of rhetorical strategies included | 20 to 16 points<br>Mastery | 16 to 12 points<br>Competence | 12 to 8 points<br>Developing | 8 to 4 points<br>Rudimentary | 4 to 0 points<br>Off track | 20 points total |
| Number of samples for each rhetorical strategy | 20 to 16 points<br>Mastery | 16 to 12 points<br>Competence | 12 to 8 points<br>Developing | 8 to 4 points<br>Rudimentary | 4 to 0 points<br>Off track | 20 points total |

*FIG. 4*

SYSTEMS AND METHODS FOR AUTOMATED ASSESSMENT OF AUTHORSHIP AND WRITING PROGRESS

CROSS REFERENCE TO RELATED APPLICATIONS

This application claims priority to U.S. application No. 62/895,628 filed Sep. 4, 2019 and titled "SYSTEMS AND METHODS FOR AUTOMATED ASSESSMENT OF AUTHORSHIP AND WRITING PROGRESS." which is hereby incorporated herein by reference in its entirety.

FIELD OF INVENTION

The present disclosure relates generally to systems and methods for automatically assessing authorship of written work and progress toward successful completion of written tasks, such as academic or professional writing assignments.

BACKGROUND

In academic and other settings, it is desirable to ensure that written work or similar assignment documents submitted by an individual is a product of that individual's own intellectual effort. It may also be desirable, particularly in academic settings or professional settings, to monitor an individual's progress toward completing an assignment relative to deadlines and other objectives. Traditionally, the authorship of written works or assignments such as student or professional papers has been verified manually by readers and, more recently, in automated fashion by comparing a submitted work to a corpus of other works to detect instances of uncited copying or more subtle plagiarism. Progress toward deadlines may be monitored by direct communication between individuals or with various project-tracking tools which may include software applications. Progress toward accomplishing intellectual, aesthetic, and other goals may be tracked by interpersonal interactions and review of written materials by skilled assessors, such as an instructor or supervisor.

These previous methods can be difficult, time-consuming, and inefficient due to the difficulty of identifying all possible sources of plagiarized materials and the significant time required for an instructor or supervisor to conduct individualized progress reviews.

SUMMARY

Embodiments of the claimed invention can include a system comprising a communication interface, processing circuitry and program code executable by the processing circuitry. The communication interface can be configured to electronically receive an assignment document and pass the assignment document to the processing circuitry, and, responsive to receiving the assignment document, the processing circuitry can be configured to execute a first portion of the program code to identify a user account associated with the assignment document, identify a memory location associated with the user account, and retrieve evaluation data for the assignment document from the memory location. The processing circuitry can also be configured to execute a second portion of the program code associated with an assignment evaluation engine to generate a score for the assignment document based on the evaluation data, and execute a third portion of the program code to direct the communication interface to transmit the score to a user device.

In some embodiments, the evaluation data can include activity data associated with the user account and the assignment document. In these embodiments, the activity data can include data pertaining to research and writing tasks performed within a research application environment during the process of generating the assignment document. In some embodiments, the data pertaining to the research and writing tasks can include one or more of annotating source material within the research application environment or drafting an outline of the assignment document within the application environment. In these embodiments, the assignment evaluation engine can be configured to compare the assignment data with the annotated source material or the outline to generate the score for the assignment document based on the evaluation data.

In some embodiments, the assignment evaluation engine can be configured to generate a first linguistic analysis of the assignment document and a second linguistic analysis of the outline, compare the first logistic analysis with the second linguistic analysis to identify a similarity metric, and use the similarity metric to generate the score for the assignment. In some embodiments, the data pertaining to the research and writing tasks can include reorganization event density for the outline and the reorganization event density can be represented as time-sequenced vector of buckets that correspond to different time periods of an equal predefined length. Furthermore, a value of each of the time-sequenced vector of buckets can be calculated by summing a number of reorganization events with respect to the outline during the time period associated with each of the time-sequenced vector of buckets.

Additionally or alternatively, in some embodiments, the data pertaining to the research and writing tasks can include log data indicating dates and times that the user account was used to access or otherwise interact with the research application environment in connection with drafting the assignment. In some embodiments, the assignment document can be generated in the research application environment and the log data relating to dates and times can include times and dates when the assignment document was modified within the research application environment. In some embodiments, the assignment evaluation engine can be configured to compare the dates and times to minimum or maximum thresholds to generate the score for the assignment.

In some embodiments, the evaluation data can include content statistics of the assignment document, drafting statistics for the assignment document, and research documents. In these embodiments, the score can include a sum of weighted values derived from threshold measurements of at least one of the content statistics and at least one of the drafting statistics, text and language comparison of the assignment document with at least one of the research documents, and pattern detection processes of the assignment evaluation engine with respect to the assignment document and the evaluation data. The pattern detection process can include general usage pattern detection and user account specific pattern detection. In some embodiments, the weights of the values are derived from a statistical analyses of historical evaluation data. In some embodiments, the historical evaluation data can include previously measured or inferred general usage patterns of interaction with a research application environment in generating generic historical assignment documents and the general usage pattern detection can include comparing at least one of the drafting statistics to the previously measured or inferred general usage patterns. Similarly, the historical evaluation data can include previously measured or inferred user account specific usage patterns of interactions by the user account with the research application environment in generating user account specific historical assignment documents and the user account specific pattern detection includes comparing at least one of the drafting statistics to user account specific usage patterns. In some embodiments, the evaluation data can include assignment evaluation preferences that define the weights of the values.

In some embodiments, the evaluation data can include assignment evaluation preferences and the assignment evaluation preferences can include expected values or ranges of values for at least some of the evaluation data. The assignment evaluation engine can be configured to generate the score for the assignment document based on deviations between the expected values or ranges of values and actual values for the at least some of the evaluation data.

In some embodiments, the score can include an authorship confidence score indicating a level of confidence that a user of the user account authored the assignment document. Additionally or alternatively, in some embodiments, the assignment document can include an intermediate document for a final project, the evaluation data can include assignment evaluation preferences and a rubric for the final project, and the score can include an on-track confidence score indicating a level of confidence that the intermediate document is in alignment with the assignment evaluation preferences and the rubric.

Embodiments of the claimed invention can also include a method. The method can include tracking research and writing tasks performed within a research application environment over time in connection creating an assignment document for a user account, extracting evaluation data from the research and writing tasks, and transmitting the evaluation data to a computing system over a network.

In some embodiments, the method can also include executing an assignment evaluation engine on the computing system to generate a score for the assignment document based on the evaluation data and transmitting the score from the computing system to a user device.

In some embodiments, the method can include identifying, from the evaluation data, content statistics of the assignment document, drafting statistics for the assignment document, research documents, general usage patterns of interactions with the research application environment in generating general historical assignment documents, and user account specific usage patterns of interactions by the user account with the research application environment in generating user account specific historical assignment documents. Then, the method can include calculating a first value by comparing at least one of the content statistics with a first threshold and a second value by comparing at least one of the drafting statistics to a second threshold, calculating a third value by comparing a first text and language assessment of the assignment document with a second text and language assessment of the research documents, calculating a fourth value by comparing the general usage patterns to at least one of the drafting statistics, and calculating a fifth value by comparing the user account specific usage patterns to at least one of the drafting statistics. The method can also include weighting the first value, the second value, the third value, the fourth value, and the fifth value and summing the first value, the second value, the third value, the fourth value, and the fifth value as weighted to generate the score for the assignment document.

In some embodiments, the method can include tracking historical research and writing tasks within the research application environment over time in connection with creating the general historical assignment documents or the user account specific historical documents and extracting historical evaluation data from the historical research and writing tasks. The method can also include transmitting the historical evaluation data to the computing system over the network and parsing the historical evaluation data to identify the general usage patterns and the user account specific usage patterns.

Embodiments of the claimed invention can also include a user device comprising processing circuitry, a user interface, and a transceiver device. The processing circuitry can be configured to track research and writing tasks input into a research application environment via the user interface over time in connection creating an assignment document for a user account, extract evaluation data from the research and writing tasks, and transmit the evaluation data to a computing system over a network.

BRIEF DESCRIPTION OF DRAWINGS

The invention will be better understood and features, aspects, and advantages other than those set forth above will become apparent when consideration is given to the following detailed description thereof. Such detailed description makes reference to the following drawings.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," "coupled" and variations thereof are used broadly and encompass both direct and indirect connections and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Herein, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and numerous other embodiments, examples, uses, modifications and departures from the embodiments, examples and uses are intended to be encompassed by the claims attached hereto.

For instance, it should be understood that while the present disclosure provides examples with references to one or more "students," "instructors," and related terms, that these terms are used for explanatory purposes only and that embodiments disclosed herein are not limited to a particular environment or to particular users. It should also be understood that although the disclosure may at times refer to a singular "user," "student", "administrator," and so on, that the systems and methods described herein are equally applicable when there may be more than one user, student, administrator, etc. For example, a method may involve interaction with multiple students each using one or more user devices or other computing devices, or with multiple students utilizing the same user device or other computing device, and so on. Additionally, the systems and methods of this disclosure may be applicable to professional environments, outside of the academic. For example, the systems and methods may have application in industries such as journalism, legal writing, publication, and the like. Thus, references to "students" and "administrators" or "instructors" in the present examples, may be understood to respectively refer to "employees" or "authors" and "employers," "managers," "publishers," "editors," etc. when applied in non-academic contexts.

For purposes of this application, the term "processing circuitry" shall mean presently developed or future developed processing circuitry that executes sequences of instructions contained in a memory. Execution of the sequences of instructions causes the processing circuitry to perform steps such has generating control signals. The instructions may be loaded in a random access memory (RAM) for execution by the processing circuitry from a read only memory (ROM), a mass storage device, or some other persistent storage. In other embodiments, hardwired circuitry may be used in place of or in combination with software instructions to implement the functions described. For example, all or part of the processing circuitry may be embodied as part of one or more application-specific integrated circuits (ASICs). Unless otherwise specifically noted, aspects of the processing circuitry disclosed herein are not limited to any specific combination of hardware circuitry and software, nor to any particular source for the instructions executed by the processing circuitry. Computing devices disclosed herein may comprise portable electronic devices such as a smart phone, laptop computer, tablet computer, or other portable electronic device by which data may be manually, optically, or audibly input. In some embodiments, the processing circuitry, memory, and other components may be provided by a virtualized computing environment (e.g., a "cloud" computing environment) and related distributed storage and processing systems accessible over a data networks such as the Internet.

Figure 1:
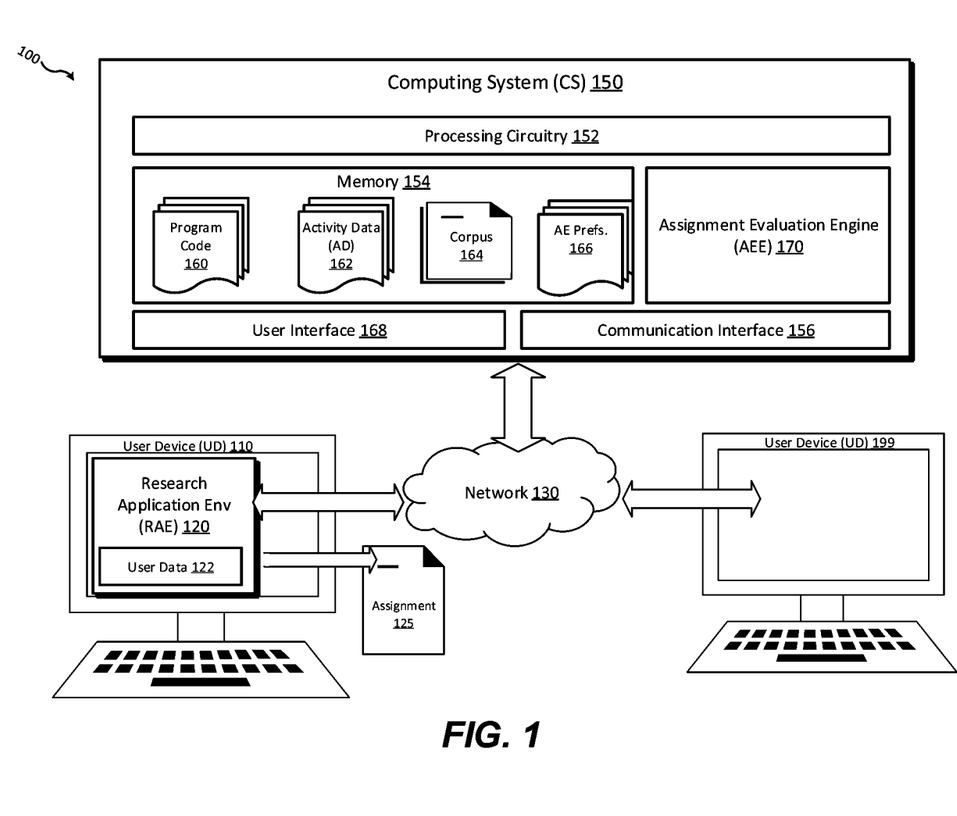
FIG. 1 is a schematic view of computing systems and user devices of a distributed computing environment according to aspects of the present disclosure.

FIG. 1 is a schematic-level diagram of aspects of an example system 100 which may assess either or both of the authorship and progress of student writing. The system 100 includes a user device (UD) 110, a computing system (CS) 150, and a UD 199. The UDs 110, 199 may communicate with the CS 150 via a network 130, which may be any applicable data network such as a LAN, WAN, or the Internet.

The UD 110 is provided with a research application environment (RAE) 120. In some embodiments, the UD 110 can include processing circuitry that executes the RAE 120. The UD 110 may be any suitable computing device, including, but not limited to a personal computer, a tablet, or a smartphone. The RAE 120 allows a student or other user of the UD 110 to perform various research and writing tasks related to researching, organizing and producing written works (hereinafter "assignments"). For instance, the RAE 120 may be used by a student to annotate source materials (sometimes referred to herein as "source documents") or content (e.g., text, images, etc.) extracted from such source materials. The source materials may be accessed via the Internet or other networks or images of source materials that have been uploaded to a memory of the UD 110 (e.g., via a scanner or other image capture device). Such source materials may include websites, files in word processing formats, image files, PDF files, books, magazines, newspapers, and the like. In some embodiments, the RAE 120 may include various third-party applications such as a web browser and a word processing application such as Word by Microsoft, Inc. or Pages by Apple, Inc. In some embodiments, the RAE 120 is partially or completely provided as a plug-in within an internet browser such as, for example, Chrome by Google, LLC., Safari by Apple, Inc. or Edge by Microsoft, Inc. In some embodiments, the RAE 120 comprises the Applicant's PowerNotes™ software product, supplied, for example, as a Google Chrome browser extension (plug-in). The RAE 120 enables users to review source documents or digital images of source documents, annotate them, and manage references to those documents, including categorizing or tagging those documents (e.g., with unique identifiers such that data extracted from the source documents may subsequently be organized according to the unique identifiers). The RAE 120 also enables users to build outlines which may contain placeholders corresponding to document references managed by the user using the RAE 120. In some embodiments, the RAE may be used to perform word processing tasks. Via interaction with the UD 110, a student may research, outline, and draft an assignment document 125 using the RAE 120 and, optionally, a separate word processing application executed by the UD 110. The RAE 120 may be configured to store (e.g., in a non-transitory computer-readable medium of the UD 110) the student's work and related materials such as source materials, records of the student's annotations, outlines, drafts, and the like as user data 122. The RAE may associate the user data 122 with a user account assigned to the student (e.g., by causing user account data of the user account to be modified to define such an association). In some embodiments, the RAE 120 may store the user data 122 within the UD 110. In some embodiments, the user data 122 may additionally or alternatively be stored at a non-transitory computer-readable memory device of a remote computing device, such as the memory 154 of the computing system 150. In some embodiments, the RAE 120 may require the student to authenticate as a user of the RAE 120 and/or the computing system 150 (e.g., by entering log-in credentials associated with a user profile of the student into a prompt generated by the RAE 120). In other embodiments, the computing system 150 may use an identifier assigned to the instance of the RAE 120 instantiated by the UD 110 to identify the student (e.g., as being associated with a particular user profile).

The CS 150 includes processing circuitry 152, memory 154, a user interface 168, an assignment evaluation engine (AEE) 170, and a communication interface 156. The memory 154 may be a non-transitory computer-readable medium that stores program code 160, and evaluation data such as activity data (AD) 162, a corpus 164, and assignment evaluation (AE) preferences 166. The processing circuitry 152 may execute the program code 160 to perform methods disclosed herein; to provide the user interface 168 to user devices such as the user devices 110, 199; and to instantiate the AEE 170 as part of performing the methods disclosed herein. The CS 150 may comprise computing devices such as personal computers, servers, and/or mobile devices such as mobile phones and tablets. The processing circuitry 152 may comprise physical computing devices and virtualized computing devices operating as software on physical computing devices. The processing circuity 152 may also comprise distributed systems of multiple computing devices communicating over a data network such as the Internet (i.e., a "cloud" computing environment). The CS 150 may be configured to communicate with external computing devices via wired and/or wireless networks including LANs and WANs, using protocols including Ethernet, Bluetooth, Wi-Fi, LTE, infrared, and others. In some embodiments, portions of the processing circuitry 152 may be provided by computing resources of the UD 110. In some embodiments, some or all of the program code 160, the activity data 162, the corpus 164, and the AE preferences 166 may additionally or alternatively be stored on a non-transitory computer readable medium of the UD 110.

The AD 162 may be retrieved by the CS 150 from the UD 110 via the RAE 120. For example, the RAE 120 may log each interaction of the student with the RAE 120 in the user data 122, and may periodically send the user data 122 to the CS 150 via the network 130. In embodiments where the RAE 120 causes the user data 122 to be stored within the UD 110, the RAE 120 may be configured to relay information of the user data 122 summarizing user activity such as retrieving reference materials; annotating reference materials; and creating, organizing, and reorganizing outlines and categories to the CS 150 for use in the AD 162 for the UD 110. In embodiments where the memory 154 of the CS 150 stores the user data 122 on behalf of the RAE 120, the CS 150 may generate the AD 162 via analysis of the user data 122. The user data 122 may include log data indicating when various portions of the user data 122 were stored, retrieved, or modified. For example the log data and/or the AD 162 for a given student may include dates and times that the student accesses or otherwise interacts with the RAE 120.

The corpus 164 is a collection of written material stored by the CS 150 for use by the AEE 170 to compare the assignment document 125 to other written works as part of assessing authorship of the assignment document 125, as will be described below. The memory 154 may also store settings provided by an administrator or other individual, including a user associated with the UD 199 who may be an instructor, for example. The processing circuitry 152 may specify desired behaviors and operating parameters of the AEE 170 based on the AE preferences 166, as will be described below.

The CS 150 may provide the user interface 168 to send and receive information from the user devices 110, 199. For example, the student may access the user interface 168 via the RAE 120 and the network 130 to communicate with the CS in order to authenticate or to access the user data 122, as non-limiting examples. In some embodiments changes to all or part of the user data 122 are passed immediately to the CS 150 or during operations which synchronize data stored temporarily on the user device 110 with data stored by the CS 150. Such synchronization may be performed via HTTP-based API calls to cloud-hosted servers that maintain an authoritative record of the user data 122 and additionally record timing and access details. Similarly, an instructor or other user of the UD 199 may access the user interface 168 to provide or update the AE preferences 166, to upload or download written works to or from the corpus 164, and access reports generated by the AEE 170, as non-limiting examples.

The AEE 170 may receive a written work such as the assignment document 125 for evaluation. The assignment document 125 may be uploaded from the UD 110 (e.g., in response to a command of the student), or from the UD 199 (e.g., in response to a command of the instructor), and may be received via communication interface 156. In some embodiments, the AEE 170 may be configured to calculate a score for the assignment document 125. In some embodiments the score can indicate how likely the assignment document 125 is to have been authored by someone other than the student (i.e., where the student is the purported author of the assignment document 125) according to one or more possible scenarios including direct plagiarism, unattributed paraphrasing of other sources, having another individual perform necessary research as part of writing the assignment document 125, and having another individual perform the actual writing of the assignment based on either research performed by the student or research performed by the individual, as non-limiting examples. Additionally or alternatively, in some embodiments, the score can indicate how likely a student is to complete the assignment document 125 in accordance with desired outcomes defined by an instructor associated with the assignment, which may be specified in the AE preferences 166 (and described in further detail below in connection to FIG. 4).

Figure 2A:
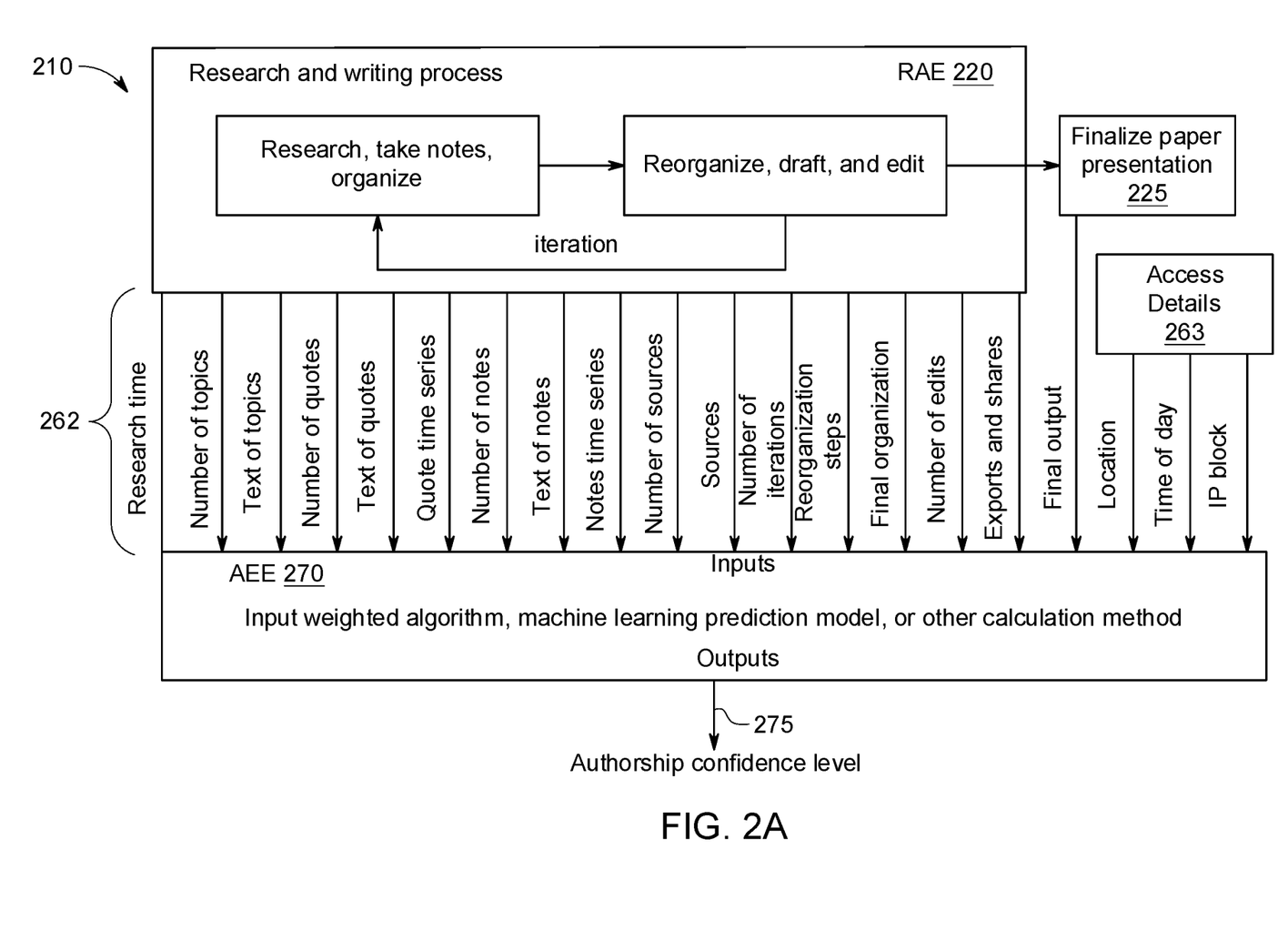
FIG. 2A is a schematic diagram illustrating aspects of the systems and methods shown in FIG. 1 in certain embodiments.

FIG. 2A is a schematic of interaction between an RAE 220 (e.g., RAE 120 of FIG. 1) and an AEE 270 (e.g., AEE 170 of FIG. 1) using a user device 210 (e.g., user device 110 of FIG. 1). The AEE 270 may, for example, be implemented via a processor of a computing system (e.g., CS 150 of FIG. 1) coupled to the user device 210 via a communication network (e.g., network 130 of FIG. 1). As shown, the RAE 220 can track research and writing tasks performed by a student or students in the RAE 220. In some embodiments, the research and writing tasks can include performing activities such as accessing, reading, and annotating source materials, and organizing notes and other information using functions and data structures provided by the RAE 220. In some embodiments, the student may reorganize information collected during their research, may draft a research summary that includes the information collected during their research and/or student-generated notes and annotations, and may edit existing information, research summaries, notes, and annotations. The student may export the research summary to an external program (e.g., a word processing program) and, using the external program may draft a paper or other writing project to produce a finalized assignment 225 (e.g., assignment document 125 of FIG. 1). In some embodiments, the assignment 225 may be drafted using the RAE 220, rather than an external program.

As shown in FIG. 2A, the RAE 220 can generate at least some of the evaluation data for the assignment 225. For example, in some embodiments, the RAE 220 can generate AD 262 (e.g. AD 162 of FIG. 1) during the research and writing process, which may include elements related to student activity having occurred at the RAE 220. In some embodiments, the AEE 270 receives the final assignment 225 as an input, along with the AD 262. The AD 262 may include access details 263 which include records of the student's interactions with the RAE 220. For each such interaction, the AEE 270 may be provided with an associated location at which the interaction was performed, which may be determined using geolocation methods from a network address (e.g., an IP address) of the user device 210 or other identifying information such as location information from a GPS receiver or cellular modem associated with the user device 210, as non-limiting examples. The access details 263 may further include time information and a block of IP addresses with which the user device 210 is associated. In some embodiments, the location information of the access details 263 may instead include coarse location information derived from the corresponding block of IP addresses of the access details 263.

In some embodiments, the RAE 220 can track user interactions with the RAE 220 via cookies in a web application, or via data stored in local application storage (e.g., stored on a memory device of the user device 210) by a browser extension and mobile app. In some embodiments changes to some or all elements of the AD 262 and/or access details 263 are passed immediately (e.g., in real-time or near-real-time) to the AEE 270 (e.g., via a communication network, such as the network 130 of FIG. 1). In some embodiments, changes to elements of the AD 262 and/or access details 263 may be stored locally on a memory device of the user device 210, and may then be sent to the AEE 270 during a synchronization time period, which may occur periodically (e.g., at predefined intervals such as once per day, hour, 15 minutes, etc.). Such synchronization may be performed via HTTP-based API calls to cloud-hosted servers that maintain an authoritative record of the AD 262 and/or access details 263. Additional usage metrics, such as time actively spent using research tool, may be tracked in the web browser or mobile app, and reported periodically to the HTTP API where they are stored together in a database (e.g., of a remote computer system such as the CS 150 of FIG. 1) for analysis. In some embodiments, this database may store all user-initiated events that are stored in an event log along with timestamps forming part of the AD 262. In some embodiments, one or more processors of the computing system associated with the AEE 270 may periodically execute computational tasks in a cloud environment, such as performing: data preparation (weighting, thresholding, normalization) with available metrics, unsupervised or supervised training of machine learning models, and reduction of available data to intermediate data. Outputs of these computational tasks may be input to a calculation algorithm executed by the AEE 270, and may be used as bases for the generation of a final authorship confidence score 275 for the academic integrity of the assignment 225 by the calculation algorithm.

At least a portion of the information in the AD 262 may be derived from user data (e.g., user data 122 of FIG. 1) stored by the user device 210. In some embodiments, the AD 262 can include content statistics of the assignment 225, drafting statistics for the assignment 225, and/or research documents. Examples of the drafting statistics in the AD 262 can include: the access details 263; a total research time metric; a number of "topics" created by the student for the assignment 225 (i.e., instances of a "topic" data structure created by the student within the RAE 220); a number of saved quotations from various source materials; a time-resolved record of how many quotations the student has saved or otherwise interacted with in each of one or more time-slots of predetermined size(s) within one or more time windows of predetermined size(s); a number of notes entered by the student; a time-resolved record of how notes entered by the student in each of one or more time-slots of predetermined size(s) within one or more time windows of predetermined size(s); a number of "iterations" performed by the student as shown; a number of times the user has reorganized items in various data structures (e.g., reordering topics in an ordered "outline" data structure); a number of times the student saves a particular object or data structure such as an outline, summary, or a "draft" data structure with a "final" or "semifinal" status designation; a number of edits made to text stored in various data structures; a number of times the student has exported data structures from the RAE 220 (e.g., exported a bibliographic reference list, a research outline, or a research summary); a number of times the student has shared information (e.g., bibliographic reference lists, research outlines, or research summaries) with other users using features of the RAE 220. The research documents in the AD 262 can include: text associated with the topics; text of the saved quotations; text of the notes entered by the student; and/or identifiers of source materials saved, annotated, or interacted with by the student. It should be understood that the foregoing list is not exhaustive and is provided for the purposes of illustration and ease of understanding of the disclosures herein. In some embodiments, the content statistics can include similar metrics to the drafting statistics but relating to the specific contents of the assignment 225. For example, examples of the content statistics can include, but are not limited to, a page length of the assignment 225, a number of quotes in the assignment 225, a number of citations in the assignment 225, a number of edits to the assignment 225, a word count for the assignment 225, etc.

In some embodiments, the total research time metric may be calculated by grouping and summing records in the AD 262 representing periods of continuous usage of the RAE 220. Topic data structures, Quotation data structures, and Note data structures may be stored directly by the computing system associated with the AEE 270 as components of Outline or Summary data structures and may be directly accessible for analysis by the AEE 270. Time series for student interactions with these and related data structures may be constructed from individual create/update/delete events recorded for Topic, Quote, Notes, Source data structures and similar data. Research iterations may be identified by categorizing all events for each user into "research," and "writing" (identified in some embodiments by implementing and executing a machine learning classification algorithm) phases. In some embodiments, the machine learning classification algorithm can include a Neural Network, Convolutional Neural Network, or similar sophisticated pattern recognition process. In some embodiments, the research and writing phases can be identified using anomaly-detection or edge-detection processes to identify points of interest in the time-series data and then applying pre-determined identification rules to the points of interest. Furthermore, in some embodiments, the anomaly-detection or edge-detection processes can be used as a fallback operation when a sufficiently large set of training data for the machine learning classification algorithm is unavailable or still being compiled by tracking general usage of the RAE 220 to create historical assignment documents.

Each identified (e.g., identified by a processor of the user device 210) transition from a writing phase to a research phase may be considered one research iteration, and may cause a research iteration counter stored in a memory device of the user device 210 to be incremented by 1. The frequency of user interactions with Outline data structures (e.g., deleting, adding or editing content of an outline during a writing phase) may be referred to as the "outline reorganization event density" and may be quantified in the AD 262. The outline reorganization event density over time may be represented as a time-sequenced vector of "buckets". Each bucket may correspond to a different time period, with each bucket time period being of equal, predefined length. The value of a given bucket may be calculated by summing the number of outline reorganization events during the time period associated with that bucket. Sharing metadata may be extracted from internal records (e.g., stored on a memory device of the computing system that includes the AEE 270) associated with a given student for each person receiving information (e.g., which may include research information such as quotes, notes, or entire outlines) shared by the student via the RAE 220. Data export metadata may be extracted from internal records (e.g., stored on a memory device of the computing system that includes the AEE 270) associated with a given student, and may the date, time, and geographic location of any event during which research information (e.g., quotes, notes, outlines, etc.) was exported from the RAE 220 to another program (e.g., a word processing program).

Figure 2B:
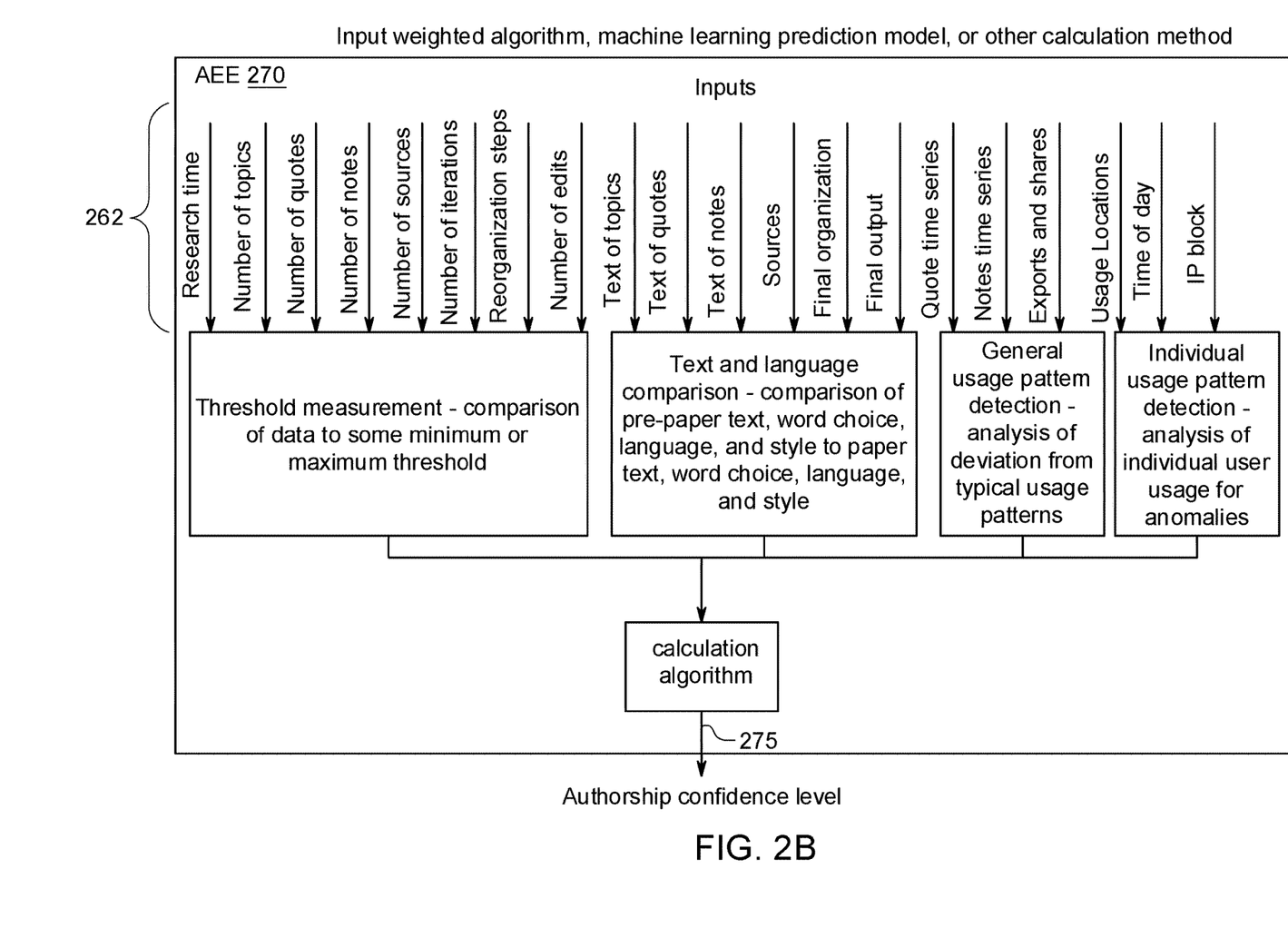
FIG. 2B is a schematic diagram illustrating aspects of the systems and methods in the embodiment of FIG. 2A in greater detail.

The final assignment 225 may be uploaded to computing system that includes the AEE 270 for analysis. Using the final assignment 225, the access details 263, and the AD 262 for the student who has purportedly authored the assignment 225, the AEE 270 may generate the score for the assignment 225. In some embodiments, the score can indicate an "authorship confidence level" 275. An illustrative approach for calculating the authorship confidence level 275 is shown in FIG. 2B. As shown, the AEE 270 may compare a portion of the AD 262 elements such as one or more of the drafting statistics and/or one or more of the content statistics to one or more predetermined minimum or maximum thresholds via a threshold measurement process. The AEE 270 may additionally or alternatively perform textual and linguistic comparison of the assignment 225 and the research documents. For example, the AEE 270 can compare an intermediary document such as a work-in-progress text (e.g., an outline or a summary) generated by the student via the RAE 220 to word choice, language, and style of the final assignment 225. The AEE 270 may also perform general usage pattern detection and/or user account specific usage pattern detection by making comparisons of a student's activities within the RAE 220 against historical evaluation data. In some embodiments, the historical evaluation data can include previously measured or inferred usage patterns for that student or for a larger general population of students, based on, respectively, individual or global student activity databases (e.g., which may be stored on a memory device included in or coupled to the CS 150). It should be understood that the text and language comparison operations, general usage pattern detection, and user account specific usage pattern detection may be performed using one or more statistical analysis techniques or by executing one or more artificial intelligence algorithms, such as machine learning algorithms (e.g., random forest, gradient boosted trees, neural networks, or other applicable machine learning algorithms).

In some embodiments, the AEE 270 can generate the score by calculating a weighted sum of values generated via the threshold measurement, text and language comparison, and pattern detection processes described above prior to providing these values to a calculation algorithm to generate the authorship confidence score 275. The weights may be determined in order to realize one or more heuristics. For example, if a student's research activity all occurs within a short period of time before the assignment 225 is due, such behavior may indicate that the student is attempting to fabricate an activity pattern to avoid suspicion of copying the assignment 225 or having someone else write the assignment 225. The weights assigned to each value may be predetermined, or they may be supplied by an instructor (e.g., via the UD 199 of FIG. 1). The weights may be defined by assignment evaluation preferences stored on the computing system that includes the AE 270 (e.g., AE 166 stored in the memory 154 of the CS 150 of FIG. 1). In some embodiments, the weights may be determined by performing statistical analyses of historical evaluation data. In some embodiments, the historical evaluation data can include previous "suspect" papers (e.g., papers having questionable authorship or for which authorship was proven to have been falsified) to determine predictors of plagiarism and other forms of cheating or academic fraud. In some embodiments, the historical evaluation data can include human-generated identifications of legitimate and "illegitimate" assignments. In such embodiments these identifications and AD 262 associated with those assignments may be used to train one or more machine learning algorithms (e.g., included in the calculation algorithm of the AEE 270) to identify factors that indicate the assignment 225 was not likely authored by the student. These machine learning algorithms may adaptively adjust the weights and other assignment evaluation preferences (e.g., AE preferences 166 of FIG. 1) as additional assignments are processed by the machine learning algorithms and as additional training data is received by the machine learning algorithms. Periodic supervised training of machine learning models may be used to tune assignment evaluation preferences stored for an unsupervised machine-learning pipeline and attendant statistical models.

In some embodiments, the AEE 270 may generate the overall authorship confidence level 275 by applying techniques such as comparing various values to expected values, ranges of values and/or threshold values stored in the assignment evaluation preferences (e.g., AE preferences 166 of FIG. 1) to numerical data derived from elements of the AD 262 and apply other techniques to non-numerical data such as prose in the assignment 225 and in text fields of various data structures such as those disclosed above and similar or related data structures. For example, in embodiments, where the assignment evaluation preferences include expected values or ranges of values for at least some of the evaluation data, the AEE 270 may generate the overall authorship confidence level 275 based on deviations between the expected values or ranges of values and actual values for the at least some of the evaluation data.

The AEE 170 may also employ natural language processing algorithms including topic modeling, sentiment analysis, and other techniques for determining actual and/or semantic similarity between texts to detect overlap between the assignment 225 and written works stored in a corpus (e.g., corpus 164 of FIG. 1). In some embodiments, the computing system or the student's instructor may identify previously-submitted papers corresponding to coursework associated with the assignment 225. Such papers may be manually (e.g., by the instructor) or automatically (e.g., by the computing system) included in the corpus. The corpus may also be populated with additional written works submitted by instructors, administrators, and other applicable users. The computing system may also automatically gather additional written works by performing automated "web-crawling" and other similar operations. In some embodiments, the AEE 270 may compare the results of linguistic analysis of the assignment 225 with previous assignments submitted authored by or on behalf of the same student; if the assignment 225 exhibits stylistic or other linguistic differences with the student's previous work, the authorship confidence score 275 generated by the AEE 270 may indicate a lower confidence that the assignment 225 was legitimately authored by the student. For example, in some embodiments, the AEE 270 can compare the linguistic analysis of the assignment 225 with a second linguistic analysis of the previous assignments, the other additional written works, and/or an outline of the assignment 225 to identify a similarity metric, and then can use the similarity metric to generate the score for the assignment 225.

In some embodiments, the general usage pattern detection and user account specific pattern detection can include the AEE 270 performing behavioral analyses as part of generating the authorship confidence level. For example, the AEE 270 may infer user behavioral patterns from the AD 262 and the access details 263 corresponding to the student associated with the user account. The AEE 270 may flag deviations from expecting behavioral patterns based by comparing the behaviors of a given student while working on the assignment 225 to past behaviors of the same student while working on previous assignments. The AEE 270 may also compare the behavior of a particular student to general aggregate (e.g., average) behaviors of other students. In some embodiments, the AEE 270 may classify student behaviors and flag changes in those classifications. For example, the AEE 270 may classify certain students as "procrastinative" or "proactive" based on their behaviors over time relative to assignment deadlines. The AEE 270 may assign a score or flag indicating that a particular student's behavior classification has abruptly changed from "procrastinative" to "proactive" and flag that student's behavior as anomalous. In some embodiments, the AEE 270 may assign a score to the determination that a student's behavior indicates an anomalous classification change along with a weight and calculating an overall authorship confidence score 275 as a weighted sum, as previously disclosed. The AEE 270 may similarly assign scores to other indicators of anomalous patterns such as changes in the inferred geographic location of the student or changes in time patterns of their access to the RAE 220. In some embodiments the AEE 270 may employ additional heuristics for flagging suspicious behaviors, such as identifying sharing of research information in the commission of academic fraud, and identifying inconsistencies between the student's research process and the final assignment 225. For example, to determine that a student may have shared their notes with a third-party paper writer the AEE 270 may track sharing and exporting activities along with the associated IP addresses (or inferred location) at which the sharing and exporting activities occurred to determine that the student has shared an inordinate amount of research information with another user account or that multiple individuals may be sharing the same account credentials. For example, time-series data for share-recipients can be used to determine that a share recipient (in, for example, another country) had much greater interaction with an outline than normal for a share recipient, and can therefore be classified as a surrogate author of the assignment 225. In some embodiments, the AEE 270 may compare references cited or quoted in the assignment 225 with source materials reviewed, annotated, cited, or quoted by the student while interacting with the RAE 220. In such embodiments, the AEE 270 may indicate a lower confidence that the student authored the assignment 225 when sources cited or quoted in the assignment 225 do not coincide with sources with source materials reviewed, annotated, cited, or quoted by the student while interacting with the RAE 220.

In some embodiments, the AEE 270 may identify that a first source cited in the assignment 225 that was not cited in the research information of the RAE 220 corresponds to a quote included in a second source that was cited in the research information of the RAE 220, and may not reduce authorship confidence in such scenarios. For example, a student may cite a less reliable source, such as a blog or a publicly edited online encyclopedia while performing research using the RAE 220, and may subsequently find a more reputable source for the information when drafting the final assignment 225. Such scenarios may not necessarily be indicative of fraudulent authorship, and may therefore be accounted for by the AEE 270.

Figure 3A:
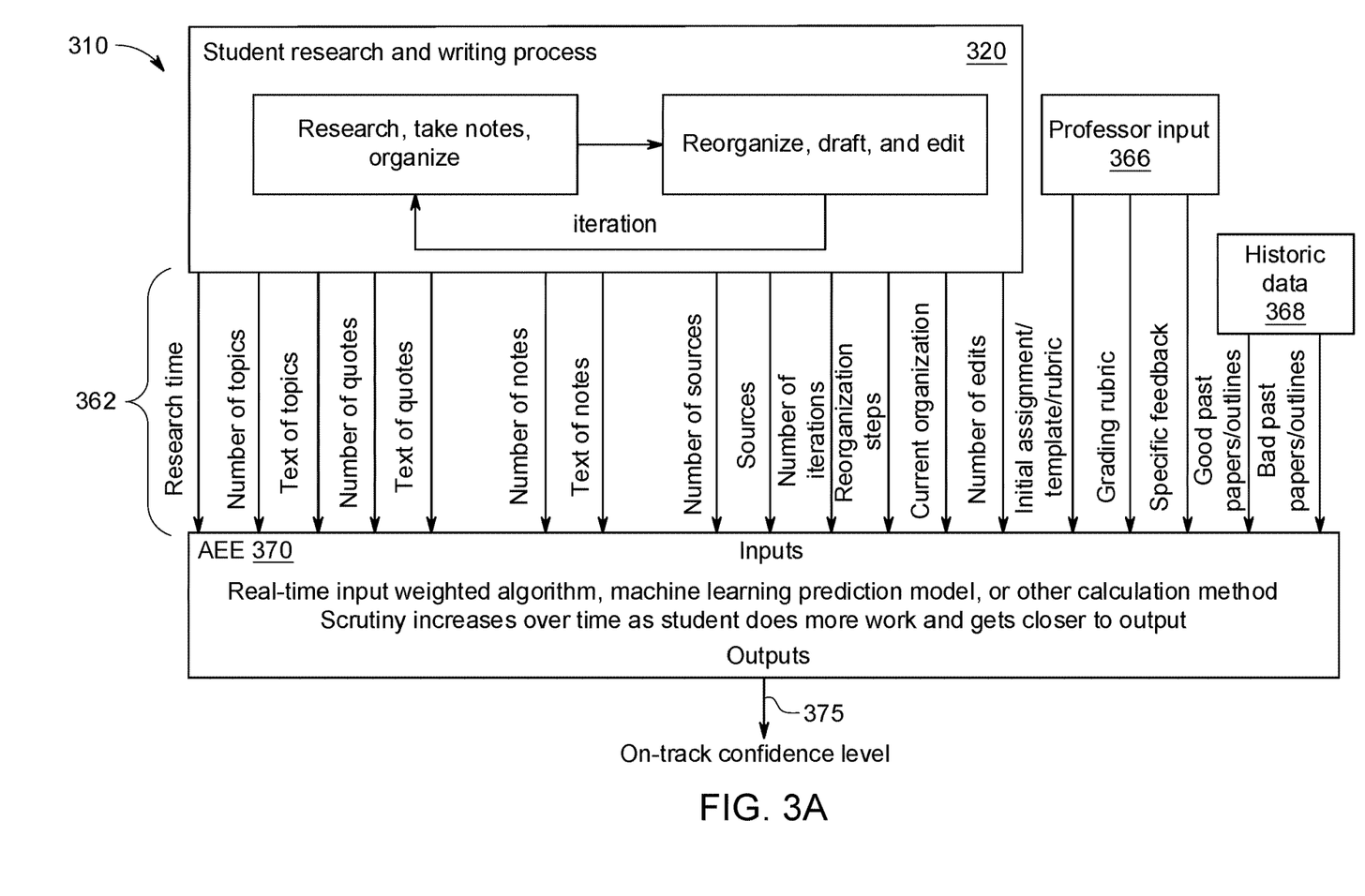
FIG. 3A is a schematic diagram illustrating aspects of the systems and methods shown in FIG. 1 in certain embodiments.
Figure 3B:
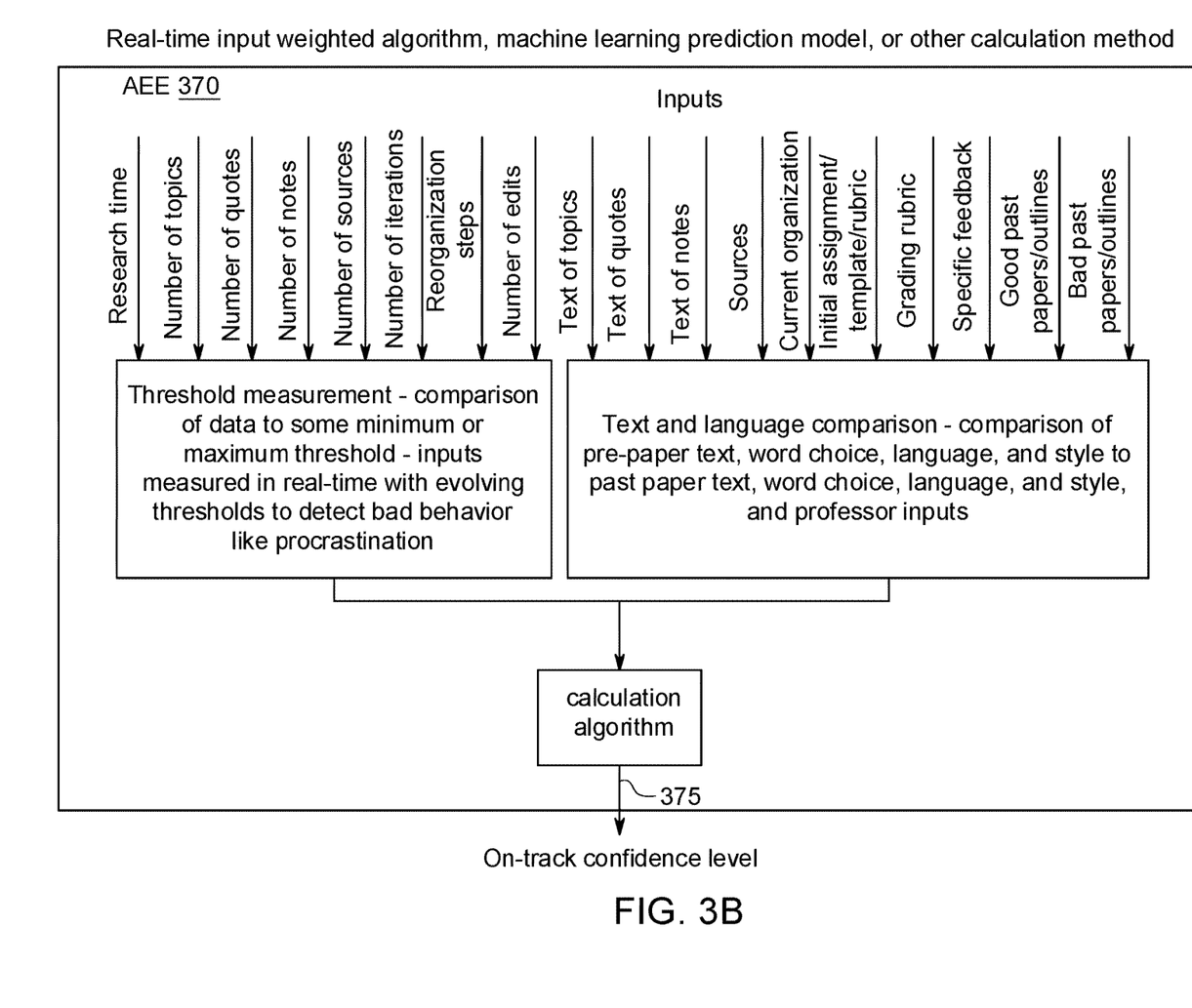
FIG. 3B is a schematic diagram illustrating aspects of the systems and methods in the embodiment of FIG. 3A in greater detail.

In some embodiments, the score can include an on-track confidence score indicating a level of confidence that the research and writing tasks being performed in the RAE 320 (e.g. the RAE 120, 220 of FIGS. 1, 2) are in alignment with producing the assignment. For example, FIGS. 3A and 3B show a system by which an AEE 370 (e.g., AEE 170, 270 of FIGS. 1, 2) may calculate one or more scores indicating whether the student's activity (e.g., research, annotation, organization, and editing) toward producing the assignment is "in alignment" with guidance provided by the student's instructor. In some embodiments, the student's activity may be considered "in alignment" when it is likely to result in submission of an assignment which aligns with a set of predetermined guidelines (e.g., a rubric or template), referred to herein as professor input 366. The professor input may be measured by various quantitative and/or qualitative metrics. In some instances, these guidelines may be set for individual students based on their past performance or other factors. The AEE 370 may use machine learning algorithms and/or other predictive analytical approaches disclosed herein to attempt to predict the student's success in completing the assignment satisfactorily using the AD 362 (e.g., AD 162, 262 of FIGS. 1, 2) of the student and training data 368 (historical data for previous assignments identified categorically as "good" or "bad" and/or assigned quality scores).

For example, in some embodiments, some of the AD 362 such as the text of the notes and/or the outlines can be processed with the machine learning algorithms. In these embodiments, a Linear Support Vector Machine trained using journal articles, high school essays, etc. can classify the text of the notes by word-choice/style/etc. to identify whether the word-choice/style/etc. is appropriate for scholarly papers and/or written at an appropriate grade level. Furthermore, in some embodiments, the outlines can be converted to vector representations and an algorithm such as Support Vector Machine, k-Nearest Neighbors, Random Forest, etc., can be used classify/quantify the quality of a student's outline. The models used for classification can be determined using Support Vector Clustering to identify clusters (vector space) of outlines meeting relevant criteria (e.g. very little progress, general framework, high level of detail, etc.). In these embodiments, the "Good past papers/outlines" and "Bad past papers/outlines" can be the inputs to the clustering/training step, and the outline can be an input (along with the models resulting from the training step) to the classification step. The output of the classification step can be fed to the calculation algorithm.

In some embodiments, an instructor (e.g., teacher, teacher's assistant, professor, etc.) may codify a rubric (see the example rubric of FIG. 4) or provide other inputs as part of the professor input 366 for quality scoring in the AE preferences 166 or an instructor may submit inputs 366 to an administrator who may codify the rubric in the AE preference 166 for use by the AEE 370 in predicting a likelihood that the student's activity is in alignment with the professor inputs 366. If the student's activity is not in alignment, the student may benefit from assistance from an instructor. The AEE 370 may also implement various heuristics to help students improve the quality of their work. For example, the AEE 370 may detect (e.g., by analyzing outlines or summaries generated via the RAE 320 to identify sources cited therein) and flag sources cited during the student's research and writing process that are considered less authoritative for reconsideration, which may cause a prompt to be generated and displayed the student via the user device 310, which recommends that the student find a different source.

The AEE 370 may use the AD 362 and values derived from the AD 362, which may collectively include some or all of the inputs described above in connection with the AEE 270 of FIGS. 2A and 2B, to determine the overall "on-track" confidence score 375 (sometimes referred to herein as an "in alignment" confidence score). These inputs can be input to a combination of threshold measurement approaches and text and language comparison approaches to generated intermediate values. These intermediate values may be provided as inputs to a calculation algorithm (e.g., which may be a machine learning model, a weighted averaging model, a statistical model, or another applicable model) to generate the on-track confidence score 375. Non-limiting examples of suitable inputs to AEE 370 for determining the on-track confidence score 375 may include time spent doing research within the RAE 320; number of Topic, Quote, and Note data structures created by the student within an Outline data structure and text contents of those data structures (for full text, keyword, writing style, and sentence-structure comparisons); organizational structures within those data structures (indicative of content organization); instructions for the assignment provided by an instructor or others; templates for the assignment; assignment rubrics; and grading rubrics.

Administrator-specified rubrics may be stored by the computing system that includes the AE 370 (e.g., the CS 150 that includes the AE 170 of FIG. 1) as part of assignment evaluation preferences (e.g., AE preferences 166 of FIG. 1) and may detail specific criteria for evaluating the student's progress. Total research time may be calculated by grouping and summing database records representing periods of continuous usage of the research application. Topic, Quote, Note, and Source data structures are stored directly as components of research Outline data structures and may therefore be made directly accessible for analysis by the AEE 370. Time series for research content events are constructed from individual create/update/delete events recorded for Topic, Quotes, Notes, Sources, and similar data. In some embodiments, research iterations may be inferred by categorizing all interactions with the RAE 320 by each student into "research" and "writing" using machine-learning-based classification algorithm, for example. Outline reorganization event density over time may be calculated by summing the number of outline adjustment events over discrete intervals having time periods of equal length. Historical assignment and research data (e.g., corresponding to the project to which the assignment being evaluated is associated; sometimes referred to herein as "historical assignments") corresponding to other students' activity that has been previously tracked and evaluated may be stored in a corpus (e.g., corpus 164 of FIG. 1) and may be used by the AEE 370 for comparison to topics, quotes, and notes generated during the research and writing process of the student. For example, the historical assignment and research data may include the research, organization, and editing activity of past students, the final assignments submitted by those students, and grades for those final assignments. In some embodiments, at least a portion of the historical assignment and research data may be stored in a separate database, for use in supervised training of one or more machine-learning-based assessment modeling algorithms. In some embodiments, an AEE such as the AEE 370 may continually or periodically update the on-track confidence score 375. The AEE 370 may generate an alert upon determining that the on-track confidence level 375 for a student has fallen below a predetermined threshold. The AEE 370 may send the alert to an instructor (e.g., via the UD 199 of FIG. 1) and/or to the student (e.g., via the UD 110, 310, FIGS. 1, 3). The alert, when sent to the instructor, may include a recommendation that the instructor intervene and/or provide further feedback to the student. The alert, when sent to the student, may include one or more recommendations defining how the student modify their research methods, outline, or other activities or works-in-progress in order to better align with the guidelines provided by one or more of the professor inputs 366. Such recommendations may be pre-defined in the memory of the computing system, or may be dynamic, with the AEE 370 identifying specific deficiencies (e.g., use of off-topic quotes, disreputable sources, lack of relevant key words or dates, improper formatting or organization, or other applicable deficiencies) or anomalies via analysis of the AD 362 or the intermediate values derived from the AD 362 and generating the recommendations based on those identified deficiencies or anomalies.

Figure 4:
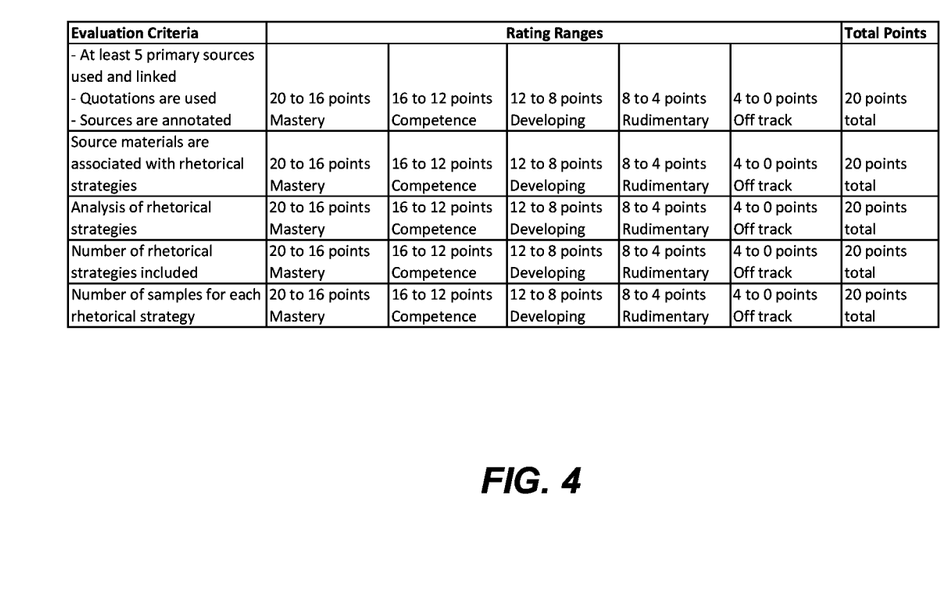
FIG. 4 is an example of a grading rubric that may be provided as an input in the embodiment shown in FIGS. 3A-3B.

FIG. 4 is an example rubric for numerically scoring assignment quality. In some embodiments, an AEE such as the AEEs 170 or 370 analyzes data structures associated with a student's work in progress toward completing an assignment stored as part of the activity data for that student. In such embodiments, an AEE may perform appropriate textual analysis techniques such as those described above to score the work in progress (e.g., which may include outlines or summaries generated by the student via an RAE such as RAE 120, 320 of FIGS. 1, 3A, during their research and writing process). The score assigned to the work in progress at various points in time may be used by one or more machine learning algorithms to predict an expected score or range of scores for the finished assignment resulting from the work in progress, using the techniques described above in connection with FIGS. 3A and 3B and similar techniques. Individual predicted scores and trends in those scores over time may be used by instructors to identify students who would benefit from intervention, instructor effectiveness, and the like. For example, in some embodiments, the AEE can calculate an error value (e.g., the Mean Absolute Error, or similar error measurement) for a normalized version of user activity data (e.g. time-series data described herein) as compared against predetermined models (such as "proactive" or "procrastinator" described above) to gauge how closely to the predetermined model a student is performing. Normalization can be based on known beginning and end dates of the assignment, and can take into account a day-of-week and a remaining time until a deadline.

As seen in FIG. 4, the example rubric can divide scoring of the assignment up based on the use of various Rhetorical Strategies. In some embodiments, the AEE can include a separate classification model to identify and score each possible Rhetorical Strategy. In some embodiments, the classification modal can include a Convolutional Neural Network. Furthermore, in assessing whether use of quotations and sources conforms to the requirements laid out in the rubric, a simple fuzzy text match can be employed followed by a search for an annotation and matching record in the works cited section of the assignment.

What is claimed is:

1. A system comprising:
    a communication interface;
    processing circuitry; and
    program code executable by the processing circuitry,
    wherein, the communication interface is configured to electronically receive an assignment document and pass the assignment document to the processing circuitry,
    wherein, responsive to receiving the assignment document, the processing circuitry is configured to execute a first portion of the program code to identify a user account associated with the assignment document, identify a memory location associated with the user account, and retrieve evaluation data for the assignment document from the memory location,
    wherein, the processing circuitry is configured to execute a second portion of the program code associated with an assignment evaluation engine,
    wherein the assignment evaluation engine is configured to:
        generate a first linguistic analysis of the assignment document and a second linguistic analysis of an outline,
        compare the first linguistic analysis with the second linguistic analysis to identify a similarity metric, and use the similarity metric to generate a score for the assignment document, and
    wherein the processing circuitry is configured to execute a third portion of the program code to direct the communication interface to transmit the score to a user device.

2. The system of claim 1, wherein the evaluation data includes activity data associated with the user account and the assignment document, wherein the activity data includes data pertaining to research and writing tasks performed within a research application environment during the process of generating the assignment document.

3. The system of claim 2, wherein the data pertaining to the research and writing tasks includes one or more of annotating source material within the research application environment or drafting an outline of the assignment document within the application environment, wherein the assignment evaluation engine is configured to compare the assignment document with the annotated source material or the outline to generate the score for the assignment document based on the evaluation data.

4. The system of claim 3, wherein the data pertaining to the research and writing tasks includes reorganization event density for the outline, wherein reorganization event density is represented as time-sequenced vector of buckets that correspond to different time periods of an equal predefined length, and wherein a value of each of the time-sequenced vector of buckets is calculated by summing a number of reorganization events with respect to the outline during the time period associated with each of the time-sequenced vector of buckets.

5. The system of claim 2, wherein the data pertaining to the research and writing tasks includes log data indicating dates and times that the user account was used to access or otherwise interact with the research application environment in connection with drafting the assignment.

6. The system of claim 5, wherein the assignment document is generated in the research application environment, and wherein the log data relating to dates and times includes times and dates when the assignment document was modified within the research application environment.

7. The system of claim 5, wherein the assignment evaluation engine is configured to compare the dates and times to minimum or maximum thresholds to generate the score for the assignment.

8. The system of claim 1, wherein the evaluation data includes content statistics of the assignment document, drafting statistics for the assignment document, and research documents, wherein the score includes a sum of weighted values derived from threshold measurements of at least one of the content statistics and at least one of the drafting statistics, text and language comparison of the assignment document with at least one of the research documents, and pattern detection processes of the assignment evaluation engine with respect to the assignment document and the evaluation data, wherein the pattern detection process includes general usage pattern detection and user account specific pattern detection.

9. The system of claim 8, wherein the weights of the values are derived from a statistical analyses of historical evaluation data.

10. The system of claim 9, wherein the historical evaluation data includes previously measured or inferred general usage patterns of interaction with a research application environment in generating generic historical assignment documents, wherein the general usage pattern detection includes comparing at least one of the drafting statistics to the previously measured or inferred general usage patterns, wherein the historical evaluation data includes previously measured or inferred user account specific usage patterns of interactions by the user account with the research application environment in generating user account specific historical assignment documents, and wherein the user account specific pattern detection includes comparing at least one of the drafting statistics to user account specific usage patterns.

11. The system of claim 8, wherein the evaluation data includes assignment evaluation preferences that define the weights of the values.

12. The system of claim 1, wherein the evaluation data includes assignment evaluation preferences, and wherein the assignment evaluation preferences include expected values or ranges of values for at least some of the evaluation data, and wherein the assignment evaluation engine is configured to generate the score for the assignment document based on deviations between the expected values or ranges of values and actual values for the at least some of the evaluation data.

13. The system of claim 1, wherein the score includes an authorship confidence score indicating a level of confidence that a user of the user account authored the assignment document.

14. The system of claim 1, wherein the assignment document includes an intermediate document for a final project, wherein the evaluation data includes assignment evaluation preferences and a rubric for the final project, and wherein the score includes an on-track confidence score indicating a level of confidence that the intermediate document is in alignment with the assignment evaluation preferences and the rubric.

* * * * *